US006559973B2

(12) United States Patent
Bullock et al.

(10) Patent No.: US 6,559,973 B2
(45) Date of Patent: May 6, 2003

(54) ELECTRICAL STORAGE DEVICE FOR A REPLACEABLE PRINTING COMPONENT

(75) Inventors: Michael L. Bullock, San Diego, CA (US); Brian Helterline, Salem, OR (US)

(73) Assignee: Hewlett-Packard Company, Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/918,780

(22) Filed: Jul. 30, 2001

(65) Prior Publication Data

US 2002/0001093 A1 Jan. 3, 2002

Related U.S. Application Data

(63) Continuation of application No. 09/034,978, filed on Mar. 4, 1998, now Pat. No. 6,271,928.

(51) Int. Cl.[7] .................. G06F 15/00

(52) U.S. Cl. .................. 358/1.8; 358/1.8; 358/1.15; 358/1.17; 358/1.6; 347/19

(58) Field of Search .................. 358/1.8, 1.16, 358/1.15, 1.17; 347/19, 86; 399/113, 24, 77

(56) References Cited

U.S. PATENT DOCUMENTS

| | | | | |
|---|---|---|---|---|
| 4,803,521 A | | 2/1989 | Honda | 399/11 |
| 4,961,088 A | | 10/1990 | Gilliland et al. | 399/25 |
| 5,021,828 A | | 6/1991 | Yamaguchi et al. | 399/24 |
| 5,049,898 A | | 9/1991 | Arthur et al. | 347/19 |
| 5,138,344 A | | 8/1992 | Ujita | 347/86 |
| 5,184,181 A | | 2/1993 | Kurando et al. | 399/262 |
| 5,272,503 A | * | 12/1993 | LeSueur et al. | 399/25 |
| 5,365,312 A | | 11/1994 | Hillmann et al. | 399/12 |
| 5,699,091 A | | 12/1997 | Bullock et al. | 347/19 |
| 5,930,553 A | | 7/1999 | Hirst et al. | 399/8 |
| 6,271,928 B1 | * | 8/2001 | Bullock et al. | 358/1.16 |

FOREIGN PATENT DOCUMENTS

| | | |
|---|---|---|
| EP | 0720916 A2 | 7/1996 |
| EP | 0789322 A2 | 8/1997 |
| EP | 0940259 A2 | 9/1999 |
| EP | 0940254 A3 | 4/2000 |
| WO | WO98/04414 | 2/1998 |

* cited by examiner

*Primary Examiner*—Mark Wallerson
*Assistant Examiner*—Twyler Lamb
(74) *Attorney, Agent, or Firm*—Kevin B. Sullivan

(57) ABSTRACT

The present invention deals with a replaceable printing component for an ink-jet printing system. The ink-jet printing system is of the type having at least one replaceable component. The replaceable component includes an electrical storage device that is responsive to printing system control signals for transferring information between the printing component and the ink-jet printing system. The replaceable printing component includes a non-protected and a protected electrical storage portion. The non-protected electrical storage portion is responsive to write control signals for storing information provided to the non-protected electrical storage portion. The protected electrical storage portion has a protected state in response to an occurrence of a write protect active signal. In the protected state the protected electrical storage device prevents storage of information in the protected electrical storage portion. Both the protected and non-protected electrical storage portions are responsive to read control signals for transferring information stored in the protected and non-protected electrical storage portions, respectively, to the ink-jet printing system.

17 Claims, 6 Drawing Sheets

SECTION A-A

ELECTRICAL STORAGE DEVICE FOR A REPLACEABLE PRINTING COMPONENT

This is a continuation of copending application Ser. No. 09,034,978 filed on Mar. 4, 1998, now U.S. Pat. No. 6,271,928, which is hereby incorporated by reference herein.

BACKGROUND OF THE INVENTION

The present invention relates to ink-jet printing systems that make use of a replaceable printing component. More particularly, the present invention relates to replaceable printing components that include an electrical storage device for providing information to the ink-jet printing system.

Ink-jet printers frequently make use of an ink-jet printhead mounted within a carriage that is moved back and forth across a print media, such as paper. As the printhead is moved across the print media, a control system activates the printhead to deposit or eject ink droplets onto the print media to form images and text. Ink is provided to the printhead by a supply of ink which is either carried by the carriage or mounted to the printing system to not move with the carriage. For the case where the ink supply is not carried with the carriage, the ink supply can be intermittently or continuously connected to the printhead for replenishing the printhead. In either case, the replaceable printing components, such as the ink container and the printhead, require periodic replacement. The ink supply is replaced when exhausted. The printhead is replaced at the end of printhead life.

It is frequently desirable to alter printer parameters concurrently with the replacement of printer components such as discussed in U.S. patent application Ser. No. 08/584,499 entitled "Replaceable Part With Integral Memory For Usage, Calibration And Other Data" assigned to the assignee of the present invention. Patent application Ser. No. 08/584,499 discloses the use of a memory device, which contains parameters relating to the replaceable part. The installation of the replaceable part allows the printer to access the replaceable part parameters to insure high print quality. By incorporating the memory device into the replaceable part and storing replaceable part parameters in the memory device within the replaceable component the printing system can determine these parameters upon installation into the printing system. This automatic updating of printer parameters frees the user from having to update printer parameters each time a replaceable component is newly installed. Automatically updating printer parameters with replaceable component parameters insures high print quality. In addition, this automatic parameter updating tends to ensure the printer is not inadvertently damaged due to improper operation, such as, operating after the supply of ink is exhausted or operation with the wrong or non-compatible printer components.

It is important that the exchange of information between the printer and the replaceable consumable be accomplished in a highly reliable manner. This exchange of information should not require the intervention of the user thereby ensuring greater ease of use and greater reliability. Furthermore, it is important that the integrity of the information be preserved. In the event that the information associated with the replaceable component is corrupted in some manner, it is important that the printer be capable of identifying this data as corrupted. Furthermore, in the event that information is corrupted the printing system should be capable of continuing operation to the extent that print quality is not diminished or the printer is not damaged.

SUMMARY OF THE INVENTION

The present invention deals with a replaceable printing component for an ink-jet printing system. The ink-jet printing system is of the type having at least one replaceable component. The replaceable component includes an electrical storage device that is responsive to printing system control signals for transferring information between the printing component and the ink-jet printing system. The replaceable printing component includes a non-protected and a protected electrical storage portion. The non-protected electrical storage portion is responsive to write control signals for storing information provided to the non-protected electrical storage portion. The protected electrical storage portion has a protected state in response to an occurrence of a write protect active signal. The protected electrical storage portion also has a non-protected state. In the non-protected state the protected electrical storage device is responsive to write control signals for storing information provided to the protected electrical storage portion. In the protected state the protected electrical storage device prevents storage of new information in the protected electrical storage portion. Both the protected and non-protected electrical storage portions are responsive to read control signals for transferring information stored in the protected and non-protected electrical storage portions, respectively, to the ink-jet printing system.

Another aspect of the present invention is that the electrical storage portion includes a write once electrical storage portion. The write once portion is responsive to only a first occurrence of write control signals for storing information provided to the write once electrical storage portion. The write once electrical storage portion is responsive to read control signals for transferring information stored in the write once electrical storage portion to the ink-jet printing system.

DETAILED DESCRIPTION OF THE PREFERRED EMBODIMENT

Each of the plurality of printheads 16 is mounted in a scanning carriage 22, which is scanned past a print media (not shown) as the print media is stepped through a print zone. As the plurality of printheads are moved relative to the print media, ink is selectively ejected from a plurality of orifices in each of the printheads 16 to form images and text.

Figure 1:
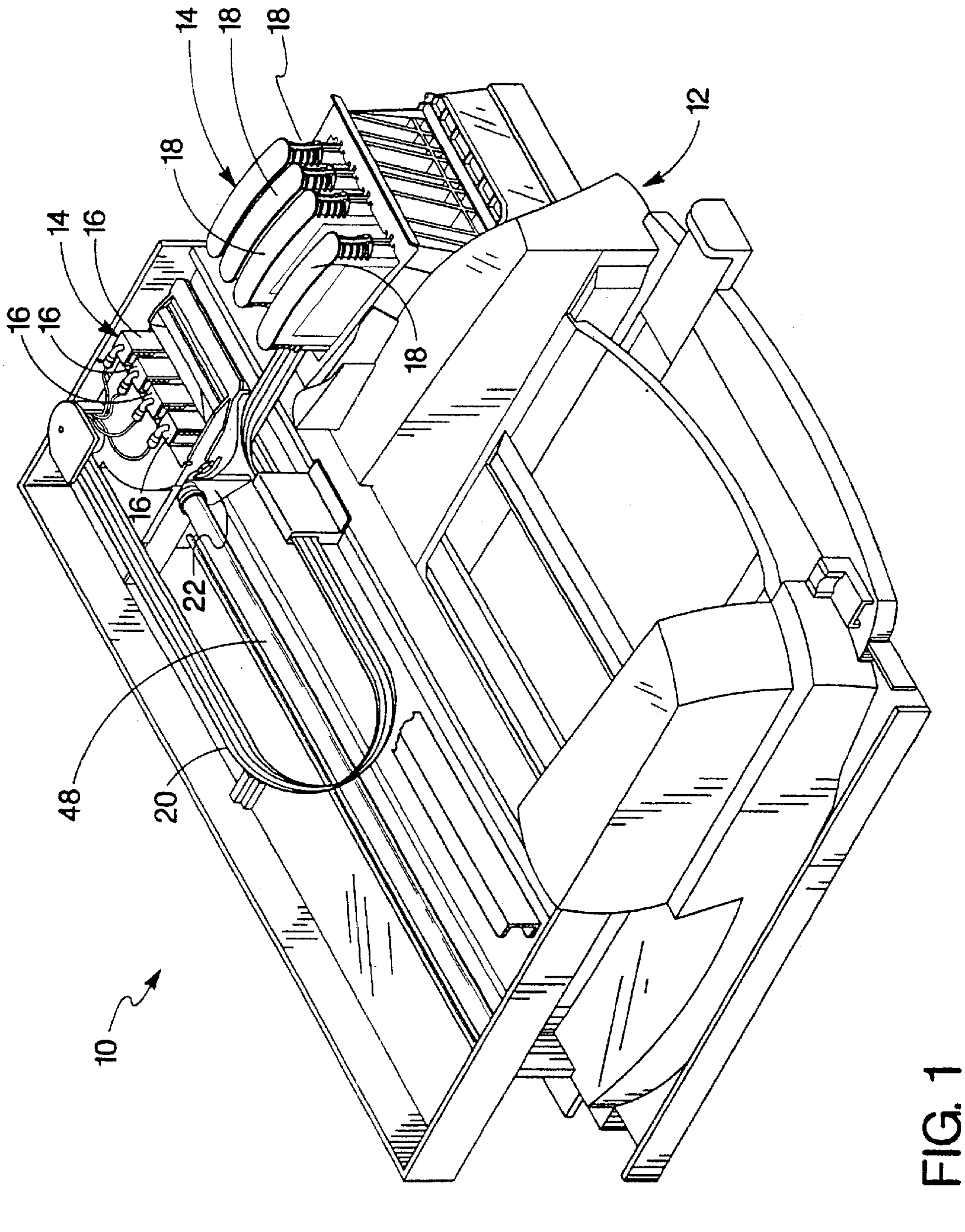
FIG. 1 depicts a perspective view of an exemplary ink-jet printing system, shown with the cover removed, that incorporates removable printing components of the present invention.

FIG. 1 is a perspective view of one exemplary embodiment of an ink-jet printing system 10 of the present invention shown with its cover removed. The ink-jet printing system 10 includes a printer portion 12 having a plurality of replaceable printing components 14 installed therein. The plurality of replaceable printing components 14 include a plurality of printheads 16 for selectively depositing ink in response to control signals and a plurality of ink containers 18 for providing ink to each of the plurality of printheads 16. Each of the plurality of printheads 16 is fluidically connected to each of the plurality of ink containers 18 by a plurality of flexible conduits 20.

One aspect of the present invention is a method and apparatus for storing information on the replaceable printing components 14 for updating operation parameters of the printer portion 12. An electrical storage device is associated with each of the replaceable printing components 14. The electrical storage device contains information related to the particular replaceable printer component 14. Installation of the replaceable printing component 14 into the printer portion 12 allows information to be transferred between the electrical storage device and the printing portion 12 to insure high print quality as well as to prevent the installation of non-compatible replaceable printing components 14. The information provided from the replaceable printing component 14 to the printing portion 12 tends to prevent operation of the printing system 10 in a manner which damages the printing system 10 or which reduces the print quality.

Although the printing system 10 shown in FIG. 1 makes use of ink containers 18 which are mounted off of the scanning carriage 22, the present invention is equally well suited for other types of printing system configurations. One such configuration is one where the replaceable ink containers 18 are mounted on the scanning carriage 22. Alternatively, the printhead 16 and the ink container 18 may be incorporated into an integrated printing cartridge that is mounted to the scanning carriage 22. Finally, the printing system 10 may be used in a wide variety of applications such as facsimile machines, postal franking machines and large format type printing systems suitable for use in displays and outdoor signage.

Figures 2A, 2B:
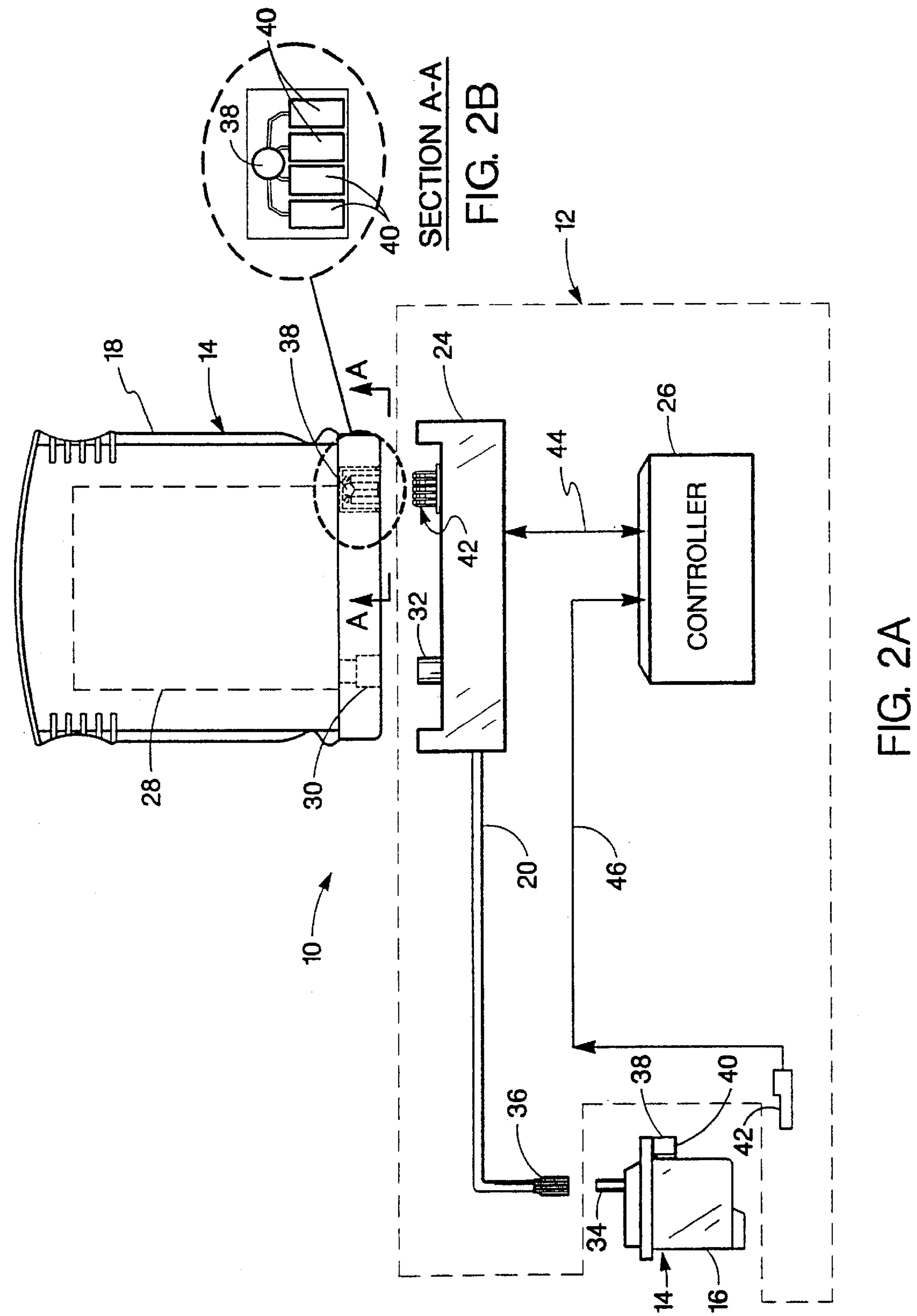
FIGS. 2A and 2B depicts a schematic representation of the ink-jet printing system shown in FIG. 1 illustrating a removable ink container and printhead each of which contain an electrical storage device.

FIGS. 2A and 2B depict a simplified schematic representation of the ink-jet printing system 10 of the present invention shown in FIG. 1. FIGS. 2A and 2B are simplified to illustrate a single printhead 16 and a single ink container 18 for accomplishing the printing of a single color. For the case where more than one color is desired a plurality of printheads 16 are typically used each having an associated ink container 18 as shown in FIG. 1.

The ink-jet printing system 10 of the present invention includes a printer portion 12 having replaceable printing components 14. The replaceable printing components 14 include a printhead 16 and an ink container 18. The printer portion 12 includes an ink container receiving station 24 and a controller 26. With the ink container 18 properly inserted into the ink container receiving station 24, an electrical and a fluidic coupling is established between the ink container 18 and the printer portion 12. The fluidic coupling allows ink stored within the ink container 18 to be provided to the printhead 16. The electrical coupling allows information to be passed between the ink container 18 and the printer portion 12 to ensure the operation of the printer portion 12 is compatible with the ink contained in the ink container 18 thereby achieving high print quality and reliable operation of the printing system 10.

The controller 26 controls the transfer of information between the printer portion 12 and the ink container 18. In addition, the controller 26 controls the transfer of information between the printhead 16 and the controller 26. Finally, the controller 26 controls the relative movement of the printhead 16 and the print media as well as selectively activating the printhead to deposit ink on print media.

The ink container 18 includes a reservoir 28 for storing ink therein. A fluid outlet 30 is provided that is in fluid communication with the fluid reservoir 28. The fluid outlet 30 is configured for connection to a complimentary fluid inlet 32 associated with the ink container receiving station 24.

The printhead 16 includes a fluid inlet 34 configured for connection to a complimentary fluid outlet 36 associated with the printing portion 12. With the printhead 16 properly inserted into the scanning carriage 22 (shown in FIG. 1) fluid communication is established between the printhead and the ink container 18 by way of the flexible fluid conduit 20.

Each of the replaceable printing components 14 such as the printhead 16 and the ink container 18 include an information storage device 38 such as an electrical storage device or memory 38 for storing information related to the respective replaceable printer component 14. A plurality of electrical contacts 40 are provided, each of which is electrically connected to the electrical storage device 38. With the ink container 18 properly inserted into the ink container receiving station 24, each of the plurality of electrical contacts 40 engage a corresponding plurality of electrical contacts 42 associated with the ink container receiving station 24. Each of the plurality of electrical contacts 42 associated with the ink container receiving station 24 are electrically connected to the controller 26 by a plurality of electrical conductors 44. With proper insertion of the ink container 18 into the ink container receiving station 24, the memory 38 associated with the ink container 18 is electrically connected to the controller 26 allowing information to be transferred between the ink container 18 and the printer portion 12.

Similarly, the printhead 16 includes an information storage device 38 such as an electrical storage device associated therewith. A plurality of electrical contacts 40 are electrically connected to the electrical storage 38 in a manner similar to the electrical storage device 38 associated with the ink container 18. With the printhead 16 properly inserted into the scanning carriage 22 the plurality of electrically contacts 40 engage a corresponding plurality of electrical contacts 42 associated with the printing device 12. Once properly inserted into the scanning carriage, the electrical storage device 38 associated with the printhead 16 is electrically connected to the controller 26 by way of a plurality of electrical conductors 46.

Although electrical storage devices 38 associated with each of the ink container 18 and the printhead 16 are given the same element number to indicate these devices are similar, the information stored in the electrical storage device 38 associated with the ink container 18 will, in general, be different from the information stored in the electrical storage device 38 associated with the printhead 16. Similarly, the information stored in electrical storage device 38 associated with each ink container of the plurality of ink containers 18 will in general be different and unique to the particular ink container of the plurality of ink containers 18. The particular information stored on each electrical storage device 38 will be discussed in more detail later.

Figure 3:
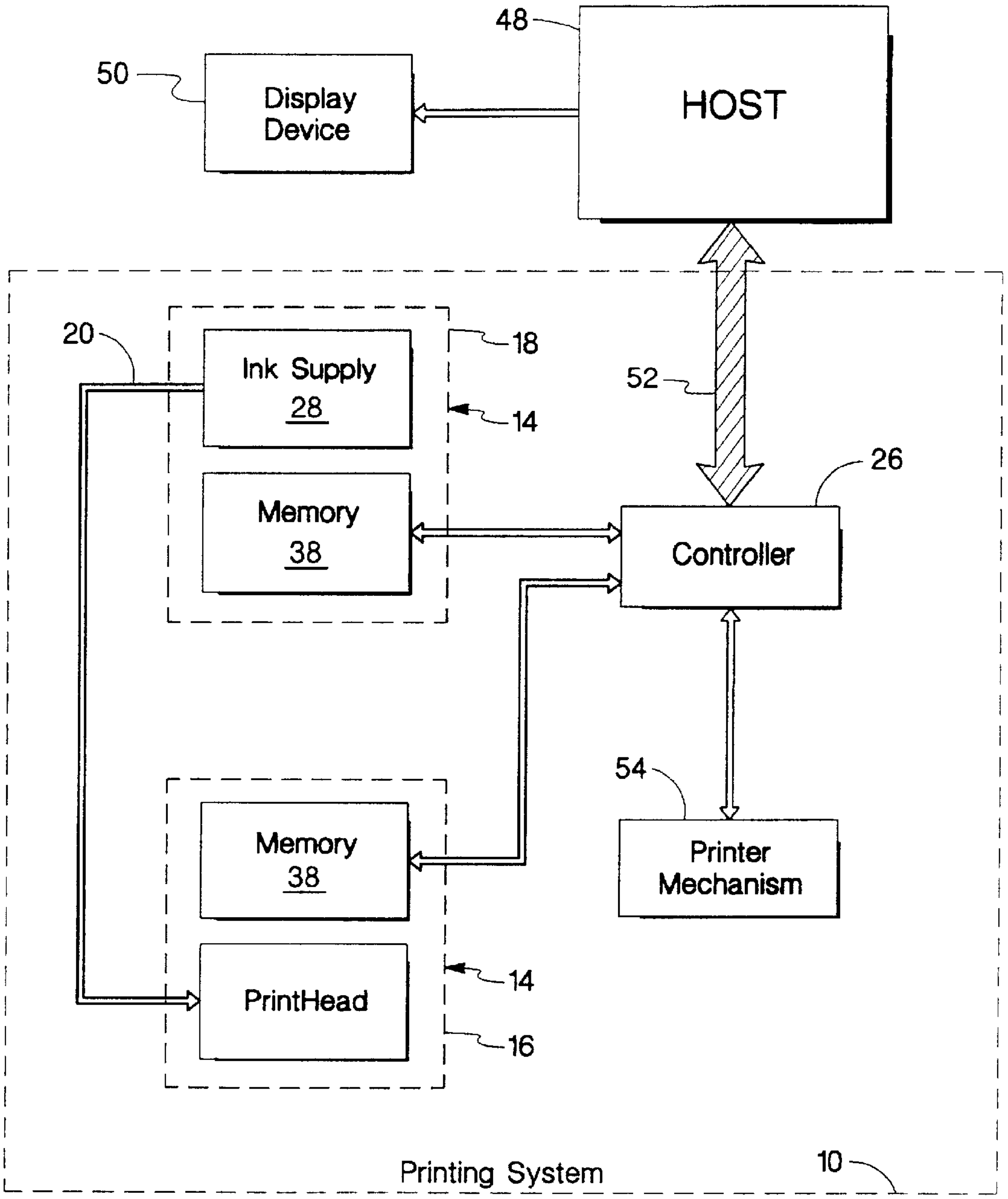
FIG. 3 depicts a schematic block diagram of the ink-jet printing system of FIG. 1 shown connected to a host and which includes a removable ink container and printhead each of which contain the electrical storage device.

FIG. 3 represents a block diagram of the printing system 10 of the present invention shown connected to an information source or host computer 48. The host computer 48 is shown connected to a display device 50. The host 48 can be a variety of information sources such as a personal computer, work station, or server to name a few, that provides image information to the controller 26 by way of a data link 52. The data link 52 may be any one of a variety of conventional data links such as an electrical link or an infrared link for transferring information between the host 48 and the printing system 10.

The controller 26 is electrically connected to the electrical storage devices 38 associated with each of the printhead 16 and the ink container 18. In addition, the controller 26 is electrically connected to a printer mechanism 54 for controlling media transport and movement of the carriage 22. The controller 26 makes use of parameters and information provided by the host 48, the memory 38 associated with the ink container 18 and memory 38 associated with the printhead 16 to accomplish printing.

The host computer 48 provides image description information or image data to the printing system 10 for forming images on print media: In addition, the host computer 48 provides various parameters for controlling operation of the printing system 10, which is typically resident in printer control software typically referred to as the "print driver". In order to ensure the printing system 10 provides the highest quality images it is necessary that the operation of the controller 26 compensate for the particular replaceable printer component 14 installed within the printing system 10. It is the electric storage device 38 that is associated with each replaceable printer component 14 that provides parameters particular to the replaceable printer component 14 that allows the controller 26 to utilize these parameters to ensure the reliable operation of the printing system 10 and insure high quality print images.

Among the parameters, for example which can be stored in electrical storage device 38 associated with the replaceable printing component 14 are the following: actual count of ink drops emitted from the printhead 16; a date code associated with the ink container 18; date code of initial insertion of the ink container 18; system coefficients; ink type/color: ink container size; age of the ink; printer model number or identification number; cartridge usage information; just to name a few.

Figure 4:
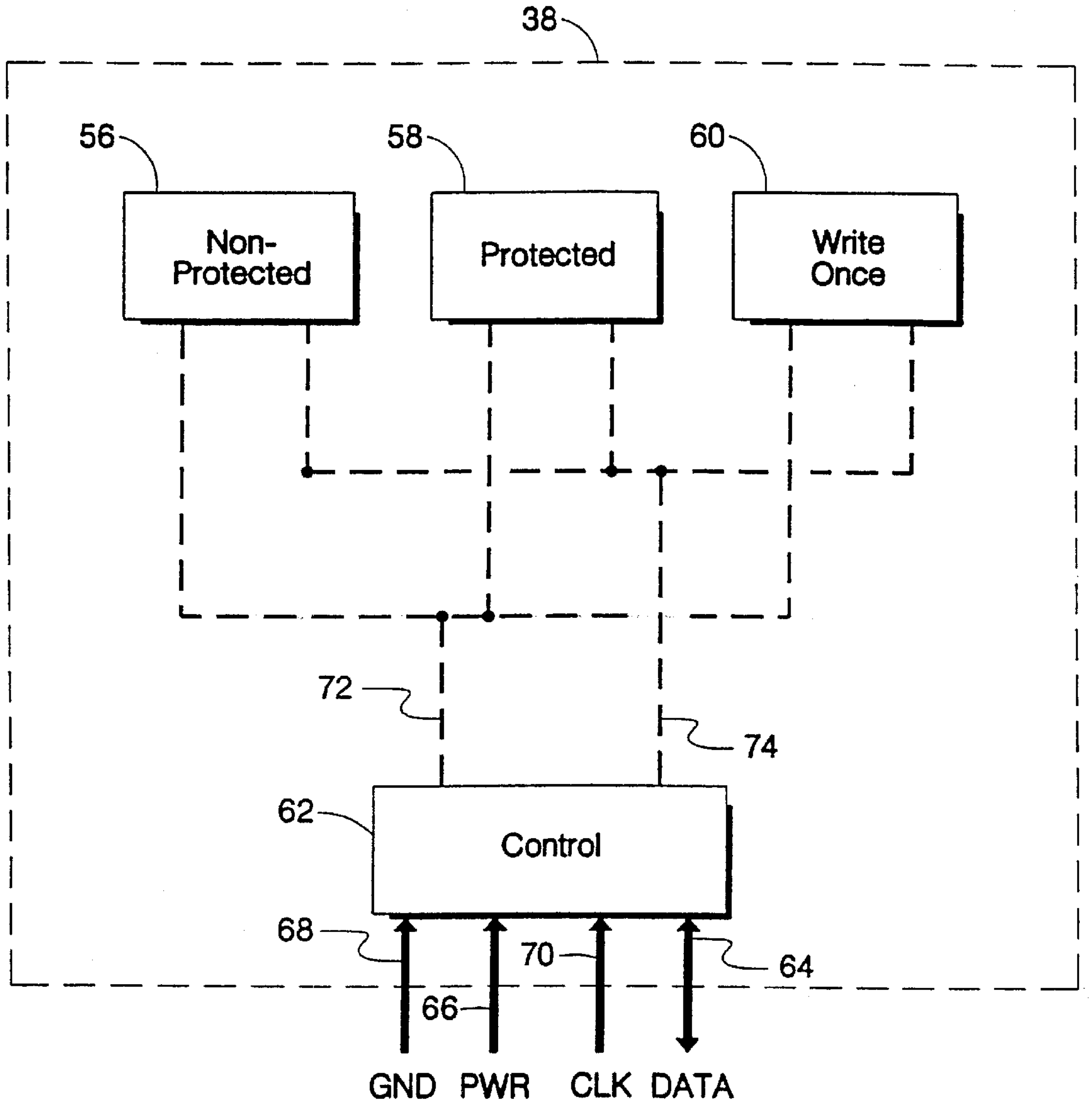
FIG. 4 depicts a schematic block diagram of the electrical storage device shown in FIGS. 3 and 4.

FIG. 4 depicts further detail of the electrical storage device 38 associated with each of the replaceable printing components 14. The electronic storage device 38 includes a non-protected storage portion 56, a protected storage portion 58, and a write-once storage portion 60. Also included in the electrical storage device 38 is a control portion 62 for controlling the transfer of information between the controller 26 and the electronic storage device 38. The control portion 62 receives address, data and control signals on a data terminal 64. The control portion 62 also receives a source of electromotive force between power and ground terminals 66, 68, respectively, and clock signals on a clock terminal 70.

For the case where information is transferred from the controller 26 to the electrical storage device 38, referred to as a memory write command, the appropriate address, data and control signals are provided serially to the data terminal 64 and appropriate clock signals are provided to the clock terminal 70 by the controller 26. For the case where information within the electrical storage device 38 is transferred to the controller 26, referred to as a memory read command, the controller 26 initiates this operation by providing address and control information serially to the data terminal 64 and appropriate clock signals to the clock terminal 70. In response to this read command the electrical storage device provides data corresponding to the address identified in a serial fashion to the data terminal 64.

The electrical storage device 38 shown in FIGS. 2A and 2B is a four terminal device. Alternatively, the electrical storage device 38 can be a two terminal device. One such two terminal device includes a power and ground terminals. Clock signals and data signals are provided on the power terminal. An example of such a two terminal memory device is a 1 K Bit read/write Electrically Programmable Read Only Memory (EPROM) such as the Dallas Semiconductor part number DS 1982, manufactured by the Dallas Semiconductor Corporation.

The control portion 62 manages data storage and retrieval for each of the memory portions 56, 58 and 60 within the electrical storage device 38. The control portion 62 receives serial control and data information on the data terminal 64 and provides parallel data and address information on internal data and address busses 72 and 74, respectively, extending between the control portion 62 and each of the non-protected 56, protected 58, and write-once 60 electrical storage portions.

The non-protected electrical storage portion 56 allows the controller 26 to write information into the non-protected electrical storage portion and retrieve information stored in the non-protected electrical storage portion. In contrast, the protected electrical storage portion 58 has a protected and a non-protected state. In the non-protected state the protected storage portion 58 acts similar to the non-protected electrical storage portion 56 allowing information to be stored in the protected storage device 58 as well as information to be retrieved from the protected storage device 58. However, in the protected state information stored in the protected electrical storage portion 58 cannot be altered during memory write commands. Once in the protected state all storage locations in the protected electrical storage device 58 cannot be altered. Information in the protected electrical storage device 58 may still be retrieved or read from another device while in this state.

The write-once memory portion 60 allows information to be stored only once in any given location within the write-once storage device 60. The implementation of the write-once electrical storage portion 60 in a binary memory device is such that each bit of each memory location within the write-once electrical storage portion 60 can only be changed to a single binary state such as 0 to 1. However, once a binary 1 state is set, this state cannot be changed from a binary 1 to a 0 state.

The use of an electronic storage device 38 that has three functionally different storage areas, the non-protected 56, the protected 58, and the write-once storage portion 60 tends to insure data integrity in the electronic storage device 38 which tends to eliminate or reduce the risk of damage to the printer or the operation of the printer with diminished print quality. For example, information relating to the volume of remaining ink within the ink container 18 is stored in a series of bits within the write-once electrical portion 60. Bach bit represents a portion of ink in a fill ink container 18. As each portion of ink is used during printing, a corresponding bit is activated or changed from 0 to 1. Therefore, when all the bits have been set there is no remaining ink within the ink container 18. It is important that the printing system 10 be prevented from operating when the ink container 18 has been exhausted. Storing information relating to the remaining ink in the write-once electrical portion 60 ensures that accurate information relating to ink remaining in the ink container 18 remains with the ink container regardless of whether the ink container 18 is removed or inserted into a similar printing portion 12. Furthermore, because this information is stored in a write-once portion 60 this remaining ink information cannot be corrupted to indicate more ink is available in the event of improper printing system 10 operation. By ensuring the integrity of the information regarding the remaining ink in the ink container 18, the printing system 10 tends to reduce or eliminate the possibility of operating the printheads without ink, which can result in catastrophic failure of the printheads.

An example of the use of the protected electrical storage portion 58 to ensure the integrity of the data in the printing system 10 will now be discussed. The protected electrical storage area 58 is useful to store parameters that must be retained after the initial programming of the electrical storage device 38. For example, in one embodiment, after being manufactured and filled with ink, ink container 18 is placed in a sealed package to preserve freshness, e.g., to prevent moisture loss from reservoir 28. Once ink container 18 is removed from the sealed package and installed into printing system 10, the ink must be used within a prescribed freshness period to insure maximum print quality. To insure optimal print quality, the first time the ink container 18 is inserted into the printer portion 12 the first insertion date is recorded in the protected electrical memory portion 58 and the protected electrical storage portion 58 is set to the protected state to prevent alteration of the protected storage portion 58. The printer portion 12 checks prior to a print operation to see if the ink container 18 is used beyond the freshness period by comparing the current date to the date of first installation. In this manner, the printing system 10 insures optimum print quality without requiring intervention of the user. Furthermore, the data integrity in the electronic storage device 38 is preserved from corruption.

Figure 5:
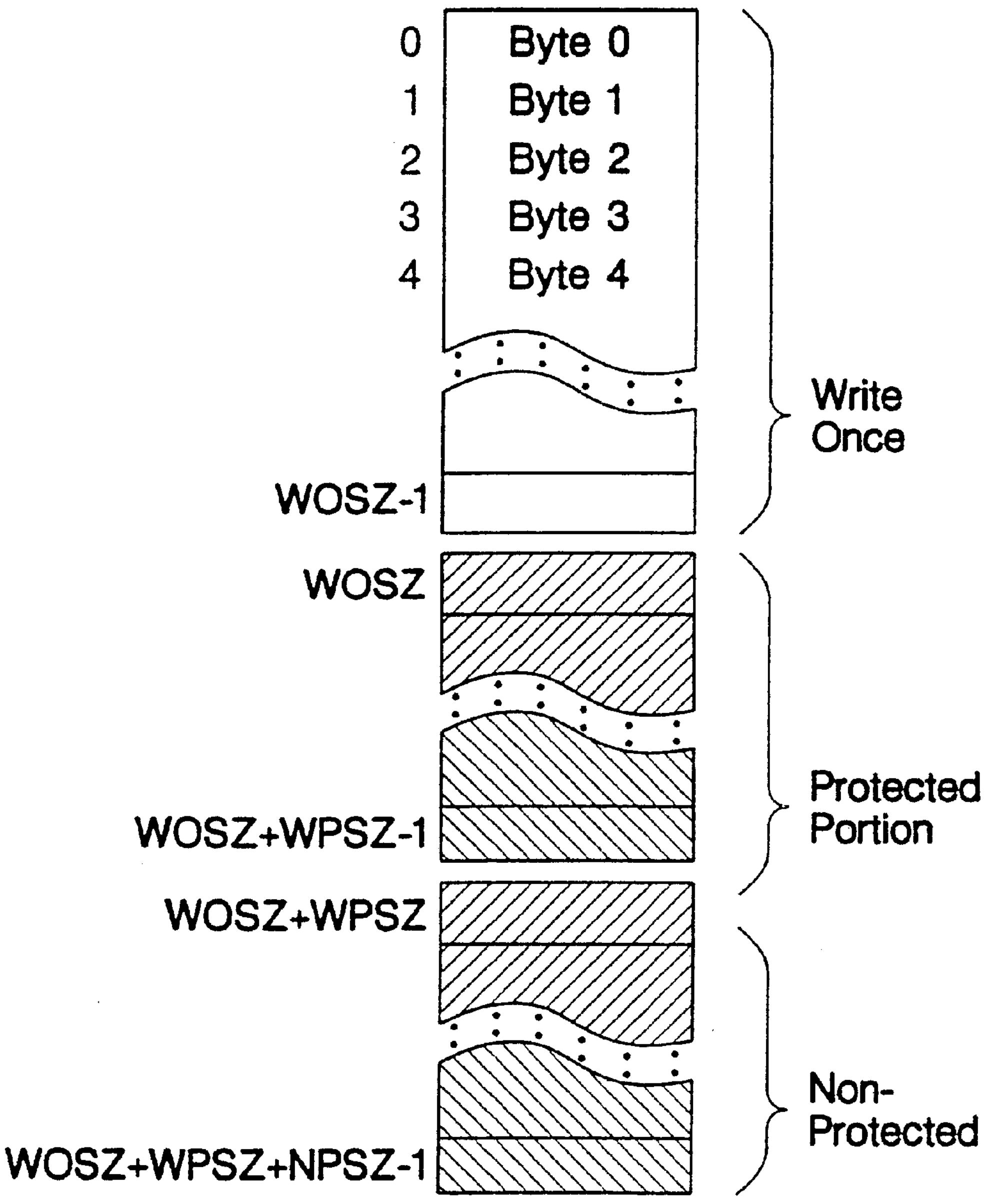
FIG. 5 depicts a logical address map for the electrical storage device of FIG. 4.

FIG. 5 depicts partitioning of the electrical storage portion 38 and logical address mapping for the write-once electrical storage portion 60, the protected electrical storage portion 58 and the non-protected electrical storage portion 56 shown in FIG. 4. In the preferred embodiment, the size or storage capacity for each of these memory portions 56, 58, 60 are specified in the electrical storage device 38. Once the replaceable printer component 14 is inserted into the printer portion 12, size information is read into the printer portion 12 to determine the size of each of the electrical storage portions 56, 58 and 60. Specifying a size of each of the memory portions allows specific memory portions to be increased if additional parameters are required allowing features to be added to the printing system 10 in the future. In addition, specifying the size of the storage portions 56, 58, 60 allows replaceable printer components to be downward compatible. For example, replaceable printer components made for printers capable of using more parameters can be used in printers that do not make use of these parameters thereby allowing downward compatibility.

As shown in FIG. 5, each of the write-once, protected portion and non-protected portions, 60, 58, 56, respectively, of the electronic storage portion 38 are organized in bytes of data. Each byte of data is represented by a binary number that is 8 bits in length. Each byte of data in the electronic storage portion 38 is stored in contiguous address locations. The write-once electrical storage portion 60 has a range of address locations that includes the lowest addresses. The non-protected electrical storage portion 56 has a range of address locations that includes the highest addresses. The protected electrical storage portion 58 has a range of address locations between the address locations for the write once electrical storage portion 60 and the non-protected electrical storage portion 56.

Once the replaceable printer component 14 inserted into the printer portion 12 or on power up of the printing system 10 the printer portion 12 reads the size information in the storage device 38. The size information may be contained in the non-protected, protected or write-once electrical storage portions 56, 58 and 60, respectively. Alternatively, the size information may be a hardwired or fixed value provided by the control portion 62 in response to a size request by the printer portion 12. This size information specifies the size of each of the write-once, protected, and non-protected electrical storage portions 60, 58, 56, respectively.

In FIG. 5 WOSZ is used to represent the size of the write-once electrical storage portion 60 and WPSZ is used to represent the size of the protected electrical storage portion 58 and NPSZ is used to represent the size of the non-protected electrical storage portion. The write-once electrical storage portion 60 then has an address range that can be represented by bytes 0 through bytes WOSZ−1. The protected electrical storage portion 58 has an address range represented by bytes WOSZ through WOSZ+WPSZ−1. Finally, the non-protected electrical storage portion 56 has an address range that is represented by bytes WOSZ+WPSZ through WOSZ+WPSZ+NPSZ−1.

Figure 6:
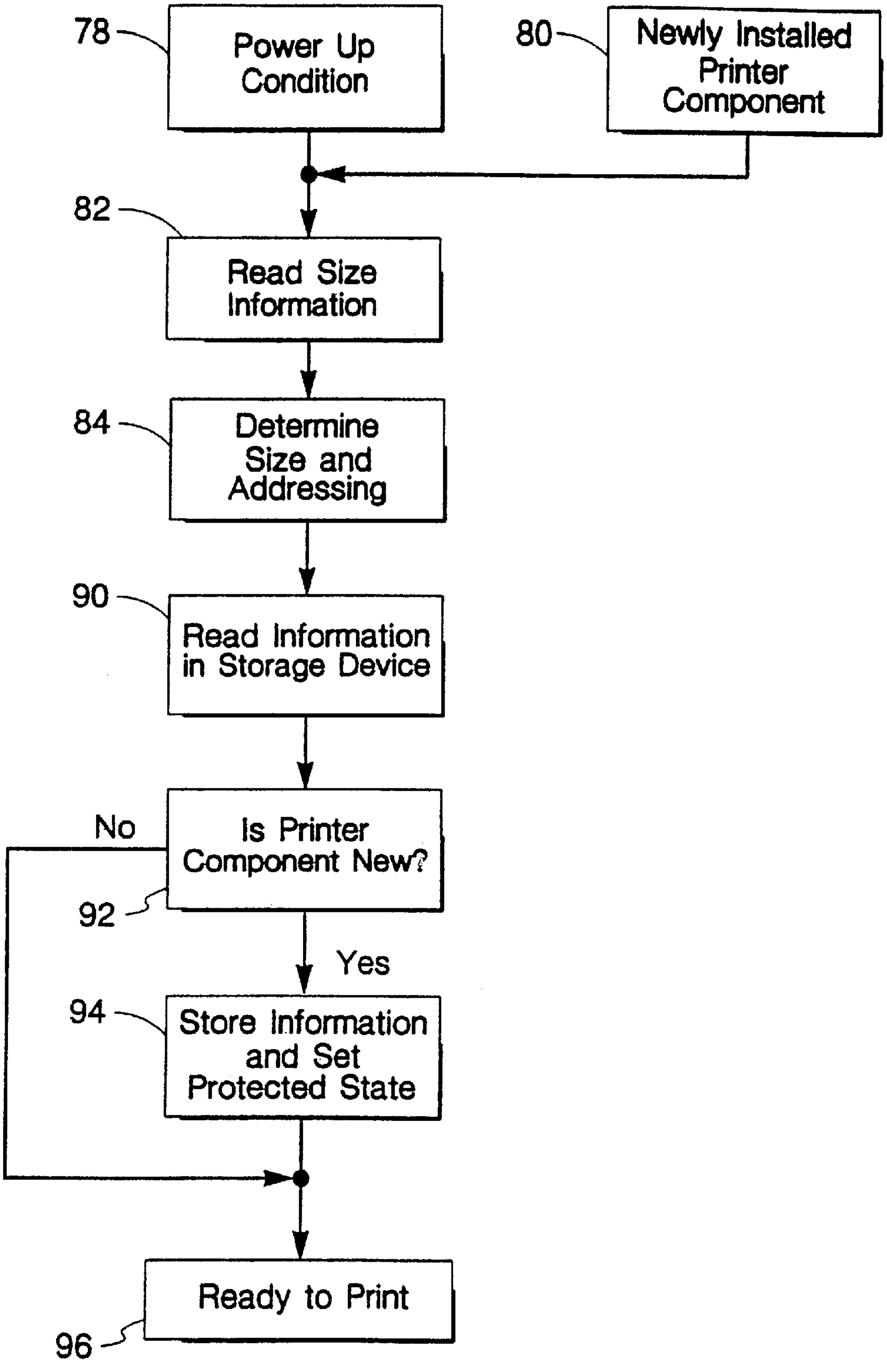
FIG. 6 depicts the method of the present invention for determining a size associated with the electrical storage device and the method for setting a protected state.

FIG. 6 depicts a method for reading the contents of the electrical storage device 38 that has an indeterminate size prior to insertion into the printing system 10. As discussed previously, the printing system 10 is capable of accepting replaceable printing components having electrical storage devices associated therewith that vary in size for a given component. The use of a variable memory size allows a given replaceable printing component to be used in a greater variety of printing systems, some of which requiring more parameters.

In operation, the printing system 10 when powered up represented by step 78 or when the replaceable printing component 14 is newly installed represented by step 80 a memory read request represented by step 82 is initiated by the controller 26 (see FIG. 3). This read request directs the electrical storage device 38 to provide the size information to the controller 26. The controller 26 interprets this information to determine the size and address range represented by step 84 for each of the non-protected, protected and write once portions 56, 58 and 60, respectively, of the electrical storage device 38.

Once the address ranges for each of the electrical storage portions 56, 58 and 60 are determined then the controller 26 requests the information within the electrical storage device 38 as represented by step 90. Once all the information within the storage device 38 is transferred to the controller 26 the controller makes use of this information to control operation of the printing system once printing begins.

As discussed previously, the technique of the present invention allows the protected electrical storage portion 58 to be modified after the initial parameters are stored in this portion at manufacture. By allowing the protected electrical storage portion 58 to be modified after manufacture allows the printer portion 12 to store additional parameters in the protected-electrical storage portion 58 prior to setting the protected state preventing further modification of the information-in this portion of the electrical storage device 38. One example of information stored in the protected electrical storage portion 58 prior to setting the protected state is the first insertion date of the ink container 18. It is important that the first insertion date for each ink container 18 be maintained in a reliable way to ensure the ink is not used after the freshness period has expired. Ink must be used within the freshness period to ensure high quality output and high reliability of the printing system 10.

After the size information has been read by the printing portion 12 as represented by step 82, a determination is made by the controller 26 whether the replaceable printing component is new as represented by step 92. A replaceable printing component 14 is new if it has not been inserted into a powered on printer portion 12. The printer portion 12 determines that the replaceable printing component 14 is new if the protected electrical storage portion 58 is not in the protected state. The state of the protected electrical storage portion 58 is determined from the electrical storage device 38. The state of the protected electrical storage portion 58 can be stored in one of the electrical storage portions 56, 58 and 60 or retained in the control portion 62. For the case where the state is retained in the control portion 62 a register may be set or fuse may be "blown" to retain the state of the protected electrical storage portion 58. The state of the protected electrical storage portion 58 is determined then by examination of the information stored in the electrical storage portions 56, 58 and 60 or an examination of a status of the control portion 62. If the protected electrical storage portion 58 is in the non-protected state then the replaceable printing component 14 is new. If the protected electrical storage portion 58 is not in the protected state then the replaceable printing component is not new.

If the replaceable printing component 14 is new then the printer portion 12 stores information appropriate for the printing component in the protected electrical storage portion 58 and sets the protected electrical storage portion 58 to the protected state as represented by step 94. In the case of an ink containers 18, the printer portion 12 stores information identifying the current-date as the first-installation date and sets the protected electrical storage portion 58 to the protected state. The printing system 10 of the present invention is then ready to print as represented by step 96.

The use of the electronic storage device associated with the replaceable consumable having the write once, protected and non-protected portions preserves the integrity of the information in the ink-jet printing system. These different storage portions allow flexibility for storing different types of information at different times. Some information is stored at manufacture, some information at first insertion and some information at various times during the operation of the printing system. The electronic storage device of the present invention provides the flexibility to accommodate these storage requirements while preserving the integrity of the information stored therein. It is critical that the integrity of the data be preserved to ensure high quality output images, provide ease of use and prevent operation of the printing system, which may damage or reduce the reliability of the printing system.

Although the present invention has been described with respect to the preferred embodiment where the replaceable printing components are the printhead portion 16 mounted on the print carriage 22 and the ink container 18 mounted off of the print carriage 22 the present invention is suited for other printer configurations as well. For example, the printhead portion and the ink container portion may each be mounted on the printing carriage 22. For this configuration each of the printhead portion and the ink container portion are separately replaceable. Each of the printhead portion and the ink container includes an electrical storage portion 38 for providing information to the printing portion 12. Each ink container of a plurality of ink containers may be separately replaceable or replaceable as an integrated unit. For the case where the plurality of ink containers is integrated into a single replaceable printing component then only a single electrical storage portion 38 is required for this single replaceable printing component.

What is claimed is:

1. A replaceable printing component for an ink-jet printing system having at least one replaceable component, the replaceable component including an electrical storage device responsive to printing system control signals for transferring information between the printing component and the ink-jet printing system, the replaceable printing component comprising:

a non-protected electrical storage portion responsive to write control signals for storing information provided to the non-protected electrical storage portion; and a protected electrical storage portion having a protected state in response to an occurrence of a write protect active signal and a non-protected state, wherein the protected electrical storage device in the non-protected state is responsive to write control signals for storing information provided to the protected electrical storage portion, and wherein the protected electrical storage device in the protected state preventing storage of information in the protected electrical storage portion, and wherein the protected and non-protected electrical storage portions are responsive to read control signals for transferring information stored in the protected and non-protected electrical storage portions, respectively, to the ink-jet printing system.

2. The replaceable printing component of claim 1 wherein the replaceable component is a replaceable ink container containing a quantity of ink, the replaceable ink container providing ink to the ink-jet printing system.

3. The replaceable printing component of claim 1 wherein the replaceable component is a replaceable ink-jet printhead, the replaceable ink-jet printhead responsive to control signals for selectively depositing ink on print media.

4. The replaceable printing components of claim 1 wherein the non-protected electrical portion and the protected electrical portion arc defined on the same die.

5. The replaceable printing component of claim 1 further including a write once electrical storage portion, the write once portion responsive to only a first occurrence of write control signals for storing information provided to the write once electrical storage portion, the write once electrical storage portion responsive to read control signals for transferring information stored in the write once electrical storage portion to the ink-jet printing system.

6. An ink-jet printing system for selectively depositing ink on print media, the ink-jet printing system comprising:

a replaceable printing component of the type having an electrical storage device associated therewith, the electrical storage device including:

a non-protected electrical storage portion responsive to write control signals for storing information provided to the non-protected electrical storage portion; and a protected electrical storage portion having a protected state in response to an occurrence of a write protect active signal and a non-protected state, wherein the protected electrical storage device in the non-protected state is responsive to write control signals for storing information provided to the protected electrical storage portion, and wherein the protected electrical storage device in the protected state preventing storage of information in the protected electrical storage portion; and a printer portion configured for receiving the replaceable printing component and establishing electrical connection therewith, the printer portion selectively providing read control signals for transferring information stored in the protected and non-protected electrical storage portions, respectively, to the printer portion and write control signal for selectively transferring information between the printer portion and the electrical storage device, wherein the printer portion selectively providing the write protect active signal to preserve data integrity within the protected electrical storage device.

7. A method for storing information in an electrical storage device, the electrical storage device associated with a replaceable printer component of an ink-jet printing system, the electrical storage device responsive to printing system control signals for transferring information between the printing component and the ink-jet printing system, the method comprising:

providing an electrical storage device having a protected electrical storage portion, the protected electrical storage portion in a non-protected state allowing storage of information in the protected electrical storage portion;

storing a first replaceable printer component parameter in the protected electrical storage portion;

inserting the replaceable printer component into the printing system;

storing a second replaceable printer component parameter in the protected electrical storage portion; and setting the protected electrical storage portion to a protected state.

8. A replaceable printing component for an ink-jet printing system having at least one replaceable component, the replaceable component including an electrical storage device responsive to printing system control signals for transferring information between the printing component and the ink-jet printing system, the replaceable printing component comprising:

a write once electrical storage portion, the write once portion responsive to only a first occurrence of write control signals for storing information provided to the write once electrical storage portion;

a non-protected electrical storage portion responsive to write control signals for storing information provided to the non-protected electrical storage portion; and a protected electrical storage portion having a protected state in response to an occurrence of a write protect active signal and a non-protected state, wherein the protected electrical storage device in the non-protected state is responsive to write control signals for storing information provided to the protected electrical storage portion, and wherein the protected electrical storage device in the protected state preventing storage of information in the protected electrical storage portion, and wherein the write once, protected and non-protected electrical storage portions are responsive to read control signals for transferring information stored in the write once, protected and non-protected electrical storage portions, respectively, to the ink-jet printing system.

9. The replaceable printing component of claim 8 wherein the replaceable component is a replaceable ink container containing a quantity of ink, the replaceable ink container providing ink to the ink-jet printing system.

10. The replaceable printing component of claim 8 wherein the replaceable component is a replaceable ink-jet printhead, the replaceable ink-jet printhead responsive to control signals for selectively depositing ink on print media.

11. The replaceable printing component of claim 8 wherein the non-protected electrical storage portion and the protected electrical portion are defined on the same die.

12. The replaceable printing component of claim 8 wherein the write once electrical storage portion is capable of storing a plurality of bits of information with each bit of information responsive to only a first occurrence of write controls for storing information provided to the write once electrical storage portion.

13. The replaceable printing component of claim 8 wherein the protected electrical storage portion is capable of storing a plurality of bits of information and wherein in the protected state the protected electrical storage portion preventing storage of information in each of the plurality of bit in the protected electrical storage portion.

14. A method for specifying data locations in an electrical storage device, the electrical storage device associated with a replaceable printer component of a printing system, the electrical storage device responsive to printing system control signals for transferring information between the printing component and the ink-jet printing system, the method comprising:

providing a write once, a protected and a non-protected electrical storage portion of the electrical storage device; and storing size information associated with each of a write once, protected and non-protected electrical storage portions of the electrical storage device into the electrical storage device wherein installation of the replaceable printer component associated with the electrical storage device into the printing system enables the printing system to determine address information for each of the write once, a protected and a non-protected electrical storage portion of the electrical storage device based on the size information.

15. The method for specifying data locations in an electrical storage device of claim 14 further including inserting the replaceable printer component into the printing system to establish electrical connection between the electrical storage device associated with the replaceable printing component and the printing system and reading the storing size information associated with each of a write once, protected and non-protected electrical storage portions of the electrical storage device to determine address locations for each of the write once, protected and non-protected electrical storage portions of the electrical storage device, the printing system using the determined address locations to transfer information between the electrical storage portion and the printing system.

16. The method for specifying data locations in an electrical storage device of claim 14 wherein the replaceable printing component associated with the electrical storage device is a replaceable ink container containing a quantity of ink, the replaceable ink container providing ink to the ink-jet printing system.

17. The method for specifying data locations in an electrical storage device of claim 14 wherein the replaceable printing component associated with the electrical storage device is a replaceable ink-jet printhead, the replaceable ink-jet printhead responsive to control signals for selectively depositing ink on print media.

* * * * *